United States Patent
Huang et al.

(10) Patent No.: US 9,407,600 B2
(45) Date of Patent: Aug. 2, 2016

(54) SERVICE ACCESS METHOD AND DEVICE FOR CONDUCTING THE SAME

(71) Applicant: TENCENT TECHNOLOGY (SHENZHEN) COMPANY LIMITED, Shenzhen, Guangdong (CN)

(72) Inventors: Bingqi Huang, Guangdong (CN); Weiyue Zhou, Guangdong (CN); Ao Xu, Guangdong (CN); Rongjian Huang, Guangdong (CN); Kaibo Sha, Guangdong (CN); Feng Jin, Guangdong (CN); Lei Chen, Guangdong (CN); Guoqiao Xiao, Guangdong (CN); Dehua Cao, Guangdong (CN); Mingyan Liu, Guangdong (CN); Ying Liu, Guangdong (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 270 days.

(21) Appl. No.: 14/145,341

(22) Filed: Dec. 31, 2013

(65) Prior Publication Data
US 2014/0112345 A1 Apr. 24, 2014

Related U.S. Application Data

(63) Continuation of application No. PCT/CN2013/072223, filed on Mar. 6, 2013.

(30) Foreign Application Priority Data

Mar. 7, 2012 (CN) .......................... 2012 1 0058358

(51) Int. Cl.
*H04L 29/12* (2006.01)
*H04L 12/721* (2013.01)

(52) U.S. Cl.
CPC .......... *H04L 61/103* (2013.01); *H04L 61/2525* (2013.01); *H04L 61/2539* (2013.01); *H04L 45/66* (2013.01)

(58) Field of Classification Search
CPC ..................................................... H04L 61/103
USPC .......................................................... 370/392
See application file for complete search history.

(56) References Cited

U.S. PATENT DOCUMENTS

| | | | | |
|---|---|---|---|---|
| 5,708,654 A | * | 1/1998 | Arndt | ................ H04L 29/12009 370/242 |
| 5,987,524 A | * | 11/1999 | Yoshida | .................. H04L 61/00 709/238 |
| 7,593,404 B1 | * | 9/2009 | Droux | ................. H04L 49/9063 370/392 |

(Continued)

FOREIGN PATENT DOCUMENTS

| | | |
|---|---|---|
| CN | 101626337 | 1/2010 |
| CN | 101815014 | 8/2010 |
| WO | WO 2009/157067 | 12/2009 |

OTHER PUBLICATIONS

International Search Report for PCT/CN2013/072223, mailed Jun. 13, 2013.

*Primary Examiner* — Rasheed Gidado
(74) *Attorney, Agent, or Firm* — Nixon & Vanderhye P.C.

(57) ABSTRACT

For service access, a physical address of a specified application service corresponding to a specified IP segment is acquired by a user mode component in accordance with an IP-segment information of the specified IP segment, which is included in a virtual network interface card configured in a system container, and an address information including the physical address is transmitted to a router module of a machine kernel. A routing table is established by the router module in accordance with the address information. Then a network data packet is acquired and forwarded to a destination service site by the router module in accordance with the routing table.

7 Claims, 5 Drawing Sheets

(56) References Cited

U.S. PATENT DOCUMENTS

| | | | | |
|---|---|---|---|---|
| 7,697,434 B1* | 4/2010 | Tripathi | G06F 13/387 370/230 |
| 7,733,890 B1* | 6/2010 | Droux | H04L 49/9063 370/412 |
| 8,351,427 B2* | 1/2013 | Damola | H04L 12/2834 370/389 |
| 9,031,068 B2* | 5/2015 | Fernandez Gutierrez | H04L 12/185 370/390 |
| 2006/0251009 A1* | 11/2006 | Thommana | H04L 12/462 370/328 |
| 2007/0064696 A1* | 3/2007 | Min | H04L 41/0809 370/392 |
| 2007/0280243 A1* | 12/2007 | Wray | H04L 12/4633 370/392 |
| 2008/0117910 A1* | 5/2008 | Page | H04L 12/4633 370/392 |
| 2008/0155676 A1* | 6/2008 | Johnson | H04L 45/00 726/13 |

* cited by examiner

SERVICE ACCESS METHOD AND DEVICE FOR CONDUCTING THE SAME

This application claims priority to and is a continuation application of PCT/CN2013/072223, filed on Mar. 6, 2013 and entitled "SERVICE ACCESS METHOD AND DEVICE FOR CONDUCTING THE SAME", which claims the benefit of Chinese Patent Application No. 201210058358.0, filed with the Chinese Patent Office on Mar. 7, 2012 and entitled "METHOD AND DEVICE FOR SERVICE ACCESSING", the contents of which are incorporated herein by reference in their entirety.

FIELD OF THE INVENTION

The present disclosure relates to network communication, and more particularly to a service access method and a device for conducting the same.

BACKGROUND OF THE INVENTION

Currently, web application development necessitates accessing an application service provider for data exchange in order to request certain functions. During the application development, an application developer should acquire the internet protocol (IP) address and the port numbers of the application service provider in order to directly access the application service through the IP address and the port numbers. Typically, the application developer can obtain a list containing series IP addresses and the port numbers of various application service providers from an application programming interface (API); and then selects certain IP address and the port numbers of the application service provider providing the necessary functions. As a result, the application developer can access the certain application services to request the necessary functions through the IP addresses and the port numbers acquired from the list in accordance with the need of the web application.

However, the aforementioned approach might encounter problems. For example, whenever a new web application is developed, the application developer would need to request new functions from new application service providers, so new API protocol needs to be learned with cost in order to acquire new IP addresses and port numbers. Meanwhile, the access codes referring to the existing functions need be changed with the new API protocol. In addition, the business information cannot be secured as the IP addresses and the port numbers of the application service provider are exposed to the application service providers.

SUMMARY OF THE INVENTION

In accordance with an aspect, the present invention provides a service access method and a device for conducting the same to solve the problems of complicated processes encountered by prior art.

An embodiment of a service access method, which can be executed by a network communication system, includes:

Acquiring, by a user mode component, a physical address of a specified application service corresponding to a specified IP segment in accordance with an IP-segment information of the specified IP segment, wherein the IP-segment information is included in a virtual network interface card configured in a system container, and transmitting an address information including the physical address to a router module of a machine kernel;

establishing, by a user mode component, a routing table in accordance with the address information; and acquiring, by the router module, a network data packet; and then forwarding, by the router module, the network data packet to a destination service site in accordance with the routing table.

In another aspect of the present invention, a service access device include:

an address acquiring unit for use with a user mode component, configured to acquire a physical address of a specified application service corresponding to a specified IP segment in accordance with an IP-segment information of the specified IP segment, wherein the IP-segment information is included in a virtual network interface card configured in a system container, and transmitting an address information including the physical address to a router module of a machine kernel;

a routing table establishing unit for use with the router module of the machine kernel, configured to establish a routing table in accordance with the address information; and a data acquisition and forwarding unit for use with the router module of the machine kernel, configured to acquire a network data packet and forward the network data packet to a destination service site in accordance with the routing table.

In a further aspect of the present invention, a non-transitory computer readable medium, comprising computer-readable instructions executable by a processor to:

acquire, by a user mode component, a physical address of a specified application service corresponding to a specified IP segment in accordance with an IP-segment information of the specified IP segment, wherein the IP-segment information is included in a virtual network interface card configured in a system container, and transmit an address information including the physical address to a router module of a machine kernel;

establish, by the router module, a routing table in accordance with the address information; and acquire, by the router module, a network data packet and; then forward, by the router module the network data packet to a destination service site by the router module in accordance with the routing table.

In accordance with the present invention, a routing table is established in response to an address information and used for determining destination for forwarding data. Therefore, the real physical address of the background service can be secured from the application developers. Furthermore, the application developers need not consider router selection of network data packets, fault-tolerant processing and network load balancing so as to shorten the software developing cycle.

DETAILED DESCRIPTION OF PREFERRED EMBODIMENTS

The above advantages of the present disclosure will become more readily apparent to those ordinarily skilled in the art after reviewing the following detailed descriptions and accompanying drawings. It is to be noted that the following descriptions of preferred embodiments of this invention are presented herein for purpose of illustration and description only. It is not intended to be exhaustive or to be limited to the precise form disclosed.

For implementing the present disclosure, a kernel patch and a user mode setup are provided in a network communication system such as an operating system of a computer. For easy understanding, in the following embodiments, the kernel patch is exemplified as a router module, e.g. "Tnetagent" in Linux kernel, that can provide a dynamic network address translation (DNAT) function for network data packets of a specified IP segment so as to translate the certain IP information contained in the network data packets into an physical address information of a specified background service. A user mode corresponding to the kernel patch "Tnetagent" is known as "Tadamagent". In some embodiments, Tadamagent is used to acquire the routing (physical address) information and then forward the acquired routing information to Tnetagent. Subsequently, a routing table is established in Tnetagent in accordance with the routing information. After the network data is acquired, the network data is then forwarded from Tnetagent to the corresponding background service in accordance with the routing table.

The present disclosure will now be described more specifically with reference to the following embodiments.

Figure 1:
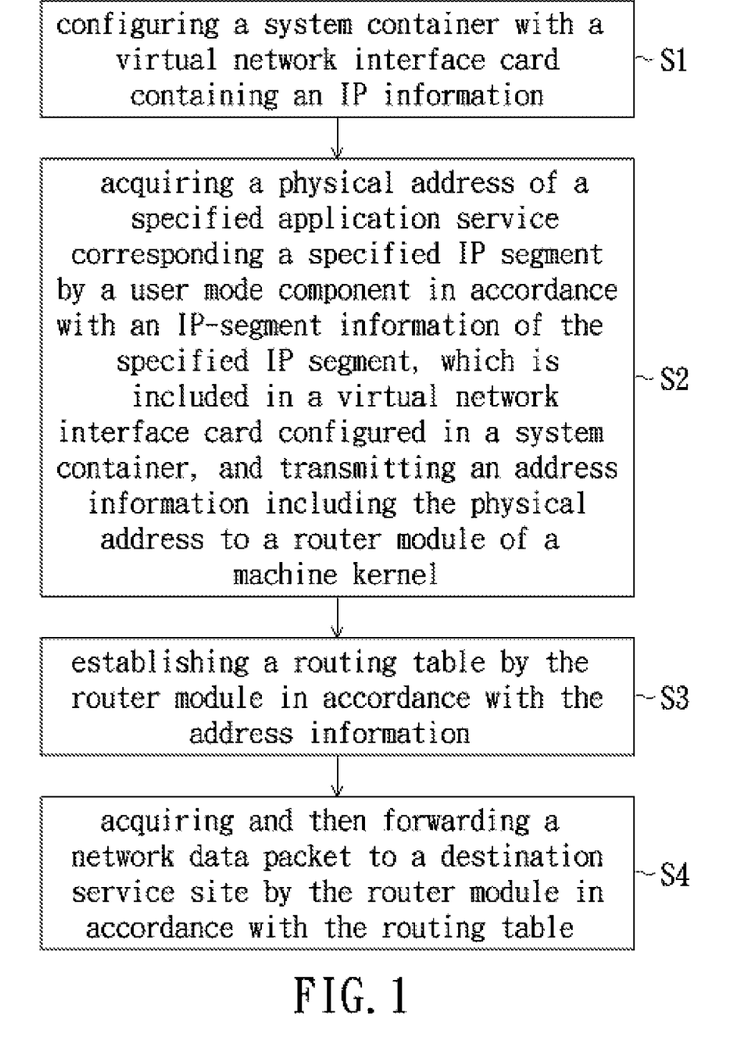
FIG. 1 is a flow chart illustrating a service access method, in accordance with an embodiment of the present invention.

FIG. 1 is a flow chart illustrating a service access method, in accordance with an embodiment of the present invention. For easy understanding, mere essential elements of the present embodiment are depicted therein.

Referring to step S1, a system container is configured with a virtual network interface card containing an IP information.

In the front step S1, the system container can be an application medium installed in the operating system for application programs to run therein. In addition, the network data packets from the application programs are also forwarded via the operating system container. In an embodiment of the present invention, the operating system may be, but not limited to, a Linux operating system. Then, the system container is a Linux container where Linux application program is installed. In a preferred embodiment of present invention, a Linux operating system includes a plurality of Linux containers, and each of the Linux containers has a virtual network interface card disposed therein. Since no physical network adaptor is involved, these Linux containers can be isolated from physical network. Meanwhile, each virtual network interface card contains specified IP-segment information, which includes a set of specified IP addresses collected in accordance with the need of service access, and a network data packet is transmitted from the corresponding port of the virtual network interface card according to an IP information contained in the network data packet.

Referring to step S2, a physical address of an application service is acquired by a user mode component in accordance with the IP-segment information included in the virtual network interface card of the system container; and an address information including the physical address is then transmitted to the router module of the kernel patch.

In an embodiment of the present invention, each virtual network interface card has specific IP-segment information, and there exists in each IP address a physical address of a corresponding application service. Preferably, the physical address includes a data communication protocol, a real physical IP address and a physical port. The address information data including correspondence of each the specific IP address to the real physical address are generated and then transmitted to the router module of the kernel patch by the user mode component.

Referring to step S3, a routing table is established by the router module in accordance with the address information.

Referring to step S4, a network data packet is acquired by the router module; and the network data packet is forwarded to a destination service site in accordance with the routing table.

In an embodiment of the present invention, the router module (e.g. Tnetagent) may function to establish and maintain the routing table as well as implement router selection of the network data packet. In addition, it also serves as a flow controller. Since the router selection is automatically conducted without the participation of any developer, the application developers need not consider the router selection of the network data packet, fault-tolerant processing and network load balancing so as to alleviate the burden of the application developers during the software application development.

Figure 2:
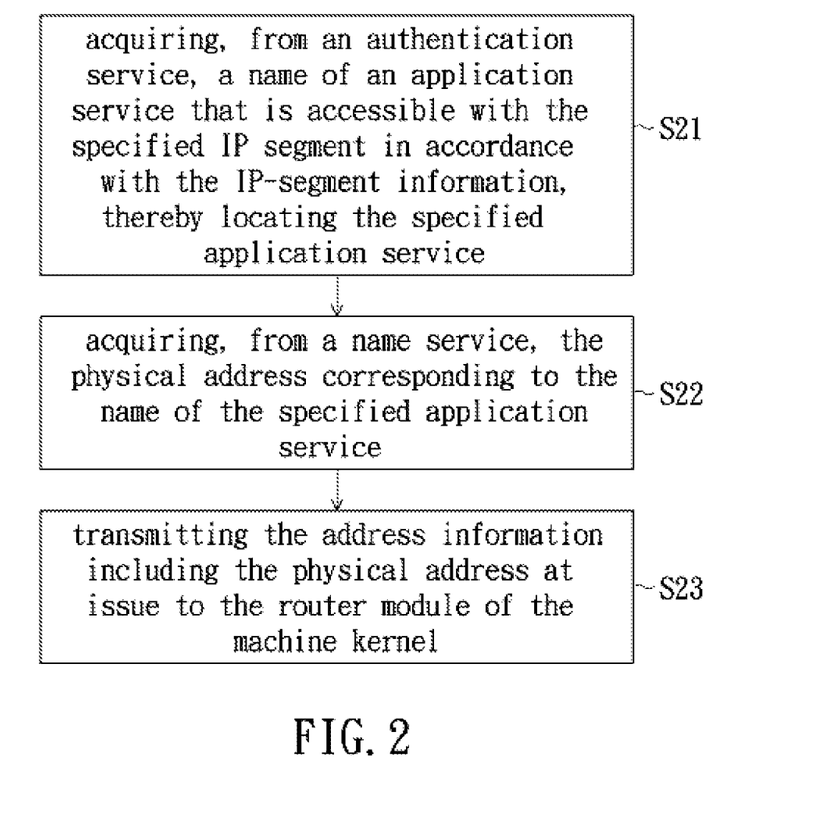
FIG. 2 is a flow chart illustrating the step 2 of FIG. 1.

For further clarifying step S2 depicted in FIG. 1, a flow chart is provided in FIG. 2 to specifically describe the process of step S2 as follows.

Referring to step S21, the user mode component acquires at least one name of application service that is accessible with the IP segment in accordance with the IP-segment information is acquired from an authentication service, thereby locating the associated application serve. Please be noted that the term "accessible" used herein may mean "authentically permitted to be accessed" in addition to "technically able to be accessed".

In the authentication service, name or names of application services (hereinafter, "VIP") accessible by each IP segment (hereinafter, "SIP") are respectively stored. In a preferred embodiment of the present invention, the name of each the application service is stored in a sequence of a transmission protocol, a destination IP address and a destination port. An application program developer can access to the desired application service according to the VIP. Generally, each SIP corresponds to at least one VIP.

Referring to step S22, the physical address corresponding to the name of the located application service is acquired from a name service.

In an embodiment, physical addresses (hereinafter, "PIP") are stored in corresponding VIPs, respectively. Preferably, each the physical address is stored in a sequence of a transmission protocol, a real physical IP address, and a real physical port. Generally, each VIP corresponds to at least one PIP.

Referring to step S23, the address information including the physical address at issue is transmitted to the router module of the kernel patch.

In an embodiment, the address information includes VIP and SIP in addition to PIP. The user mode component (e.g. Tadamagent) transmits the address information to the router module of the kernel patch (e.g. Tnetagent) in sequence in a data format of SIP-VIP-PIP. Accordingly, a routing table associated with the address information can be established by the router module.

Figure 3:
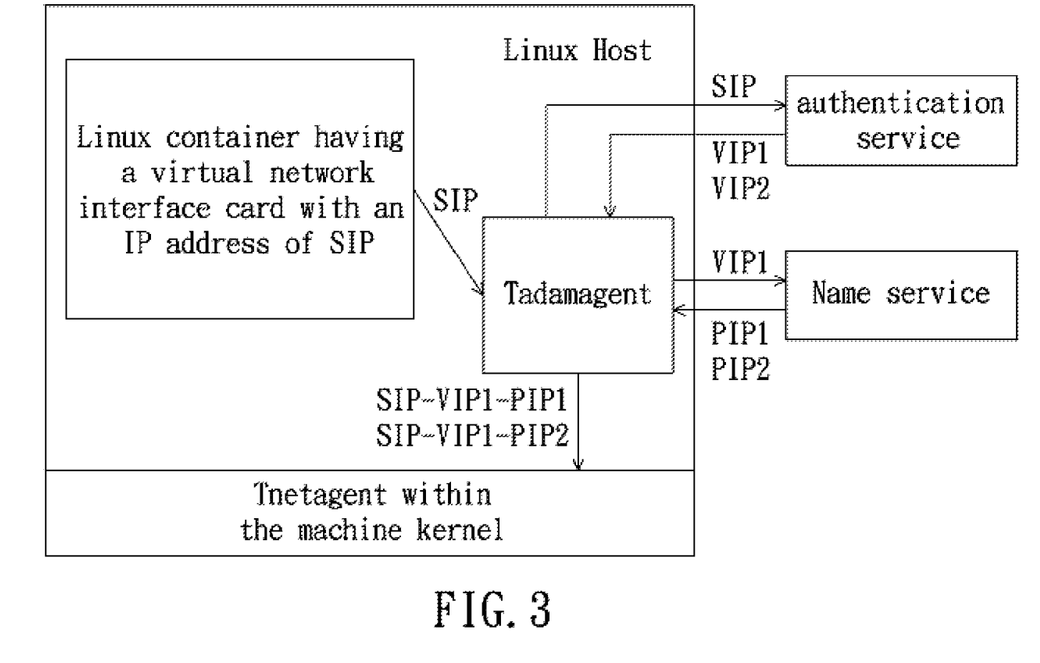
FIG. 3 is a block diagram illustrating a step for acquiring address information, in accordance with an embodiment of the present invention.

An example for practicing step 2 in order to acquire address information is given herein with reference to FIG. 3. First of all, Tadamagent acquires VIP accessible with a specified SIP from the authentication service. In this example, VIP1 and VIP2, both corresponding to the SIP, are acquired while VIP1 is desired. Subsequently, Tadamagent acquires PIP corresponding to VIP1 from the name service. In this example, PIP1 and PIP2 both correspond to the VIP1. Tadamagent then transmits the acquired address information to Tnetagent in sequence in a data format of SIP-VIP-PIP, and thus SIP- VIP1-PIP1 and SIP-VIP1-PIP2 are transmitted to Tnetagent. According to the information, Tnetagent establishes a routing table. It should be understood that the address information described above is simplified for illustration only, and is not a general or practical situation.

After the routing table is established by Tnetagent, a network data packet containing SIP information of a virtual network interface card can be transmitted, when necessary, from the virtual network interface card to the desired application service according to the PIP information recorded in the routing table and corresponding to the SIP. In this way, a dynamic network address translation (NAT) can be accomplished without disclosing real physical address and ports of the access service to the application developers. Meanwhile, the learning burden of the application developers fro software application development can be alleviated.

All the embodiments of the service access method described above can be implemented with computer-readable instructions executable by a processor of a computer system and contained in a non-transitory computer readable medium.

Figure 4:
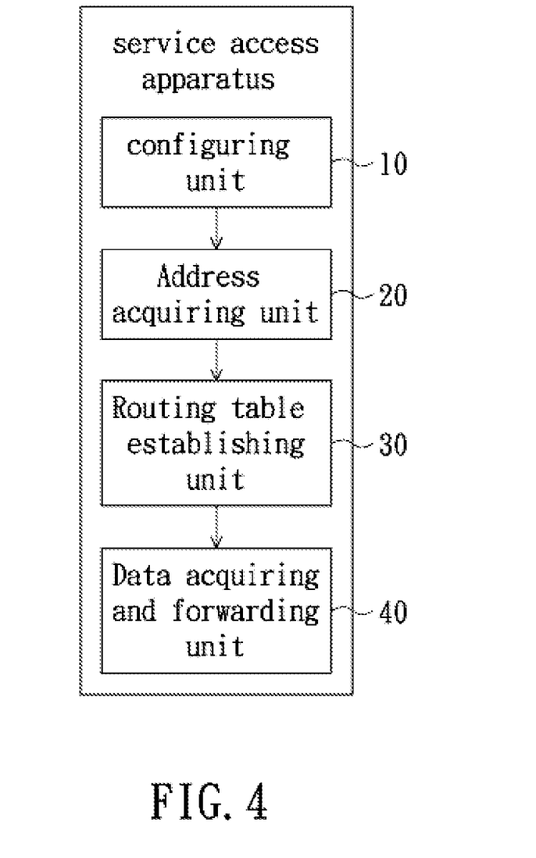
FIG. 4 is a structure diagram illustrating a service access device, in accordance with an embodiment of the present invention.

FIG. 4 is a structure diagram illustrating a service access device, in accordance with an embodiment of the present invention. The service access device shown in this embodiment includes a configuring unit 10, an address acquiring unit 20, a routing table establishing unit 30, a data acquiring and forwarding unit 40.

The configuring unit 10 is used for configuring each system container with a corresponding virtual network interface card containing an IP-segment information.

The address acquiring unit 20 is for use with a user mode component. A physical address of a specified application service corresponding to a specified IP segment in accordance with an IP-segment information of the specified IP segment, which is included in a virtual network interface card configured in a system container, is acquired. Then an address information including the physical address is transmitted to a router module of a machine kernel.

The routing table establishing unit 30 is for use with the router module of the machine kernel. It establishes a routing table is established in accordance with the address information.

The data acquisition and forwarding unit 40 is for use with the router module of the machine kernel. It acquires and forwards a network data packet to a destination service site in accordance with the routing table.

Figure 5:
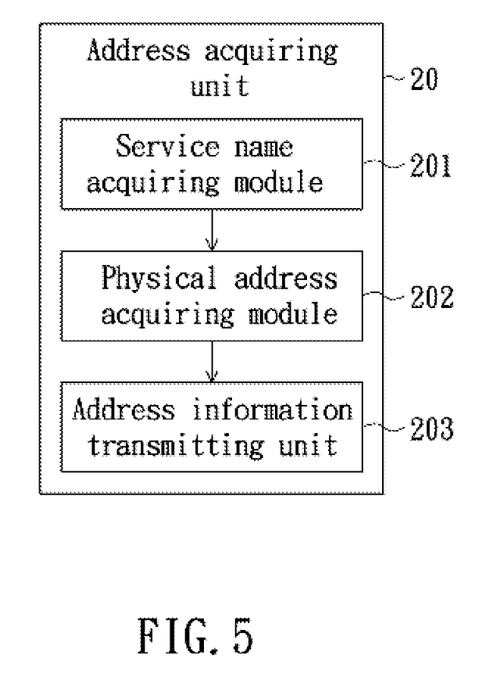
FIG. 5 is structure diagram illustrating an address acquiring unit depicted in FIG. 4.

In a further embodiment, the address acquiring unit 20 comprises a service name acquiring module 201, a physical address acquiring module 202 and an address information transmitting unit 203.

The service name acquiring module 201 is for use with the user mode component. It acquires, from an authentication service, a name of an application service that is accessible with the specified IP segment in accordance with the IP-segment information, thereby locating the desired application service.

The physical address acquiring module 202 acquires, from a name service, the physical address corresponding to the name of the specified application service.

The address information transmitting module 203 transmits the address information including the physical address to the router module of the machine kernel. In accordance with the aforementioned embodiments, a name service method and device for conducting the same are provided. An application developer can access a background service in accordance with the service name corresponding to the SIP with an operation process developed by any language through any API port, but need not have to consider the issues of router selection of the network packet, fault-tolerant processing and network load balancing, since these issues are automatically completed by the method and device of the present invention. Besides, because the physical address of the application service is shield by the system container (Linux container) and the kernel patch of the operation system (such as the router module Tnetagent), the operation process of the system container merely can access the authorized application service though Tnetagent, thus the system security can be increased significantly.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A service access method executed by a network communication system, and comprising:
   acquiring, by a user mode component, a physical address of a specified application service corresponding to a specified IP segment in accordance with an IP-segment information of the specified IP segment, wherein the IP-segment information is included in a virtual network interface card configured in a system container;
   transmitting an address information including the physical address to a router module of a machine kernel;
   establishing, by the router module, a routing table in accordance with the address information;
   acquiring, by the router module, a network data packet; and
   forwarding, by the router module, the network data packet to a destination service site in accordance with the routing table;
   wherein the physical address of the application service is acquired by sub-steps of:
      acquiring, from an authentication service, at least one name of application service that is accessible with the specified IP segment in accordance with the IP-segment information, thereby locating the specified application service; and
      acquiring, from a name service, the physical address corresponding to the name of the specified application service.

2. The service access method according to claim 1, wherein the network communication system comprises a plurality of system containers, and the service access method further comprises a step of configuring each of the system containers with a corresponding virtual network interface card containing an IP-segment information.

3. The service access method according to claim 1, wherein the address information comprises an IP address of the virtual network interface card, the name of the specified application service, and the physical address corresponding to the name of the specified application service.

4. The service access method according to claim 3, wherein the name of the specified application service is stored in a sequence of a transmission protocol, a destination IP address and a destination port; and the physical address is stored in a sequence of the transmission protocol, a real physical IP address, and a real physical port.

5. A service access device, comprising one or more processors; a memory; and a plurality of program units stored in the memory and configured to be executed by the one or more processors, wherein the plurality of program units further comprising:
- an address acquiring unit for use with a user mode component, configured to acquire a physical address of a specified application service corresponding to a specified IP segment in accordance with an IP-segment information of the specified IP segment, wherein the IP-segment information is included in a virtual network interface card configured in a system container, and configured to transmit an address information including the physical address to a router module of a machine kernel;
- a routing table unit for use with the router module of the machine kernel, configured to establish a routing table in accordance with the address information; and
- a data acquisition and forwarding unit for use with the router module of the machine kernel, configured to acquire a network data packet and forward the network data packet to a destination service site in accordance with the routing table;

wherein the address acquiring unit further comprises:
- a service name acquiring module for use with the user mode component, configured to acquire, from an authentication service, a name of an application service that is accessible with the specified IP segment in accordance with the IP-segment information, thereby locating the specified application service;
- a physical address acquiring module, configured to acquire, from a name service, the physical address corresponding to the name of the specified application service; and
- an address information transmitting module, configured to transmit the address information including the physical address to the router module of the machine kernel.

6. The service access device according to claim 5, the plurality of program units further comprises a configuring unit configured to configure each system container with a corresponding virtual network interface card containing an IP-segment information.

7. A non-transitory computer readable medium, comprising computer-readable instructions executable by a processor to:
- acquire, by a user mode component, a physical address of a specified application service corresponding to a specified IP segment in accordance with an IP-segment information of the specified IP segment, wherein the IP-segment information is included in a virtual network interface card configured in a system container;
- transmit an address information comprising the physical address to a router module of a machine kernel;
- establish, by the router module, a routing table in accordance with the address information; and
- acquire, by the router module, a network data packet; and
- forward, by the router module, the network data packet to a destination service site in accordance with the routing table;

wherein the physical address of the application service is acquired by sub-steps of:
- acquiring, from an authentication service, at least one name of application service that is accessible with the specified IP segment in accordance with the IP-segment information, thereby locating the specified application service; and
- acquiring, from a name service, the physical address corresponding to the name of the specified application service.

* * * * *